US007451105B1

(12) United States Patent
Doyle

(10) Patent No.: US 7,451,105 B1
(45) Date of Patent: Nov. 11, 2008

(54) COMPUTER APPARATUS AND METHOD FOR TRADING AND CLEARING FUTURES CONTRACTS TO ACCOMMODATE A VARIABLE SENSITIVITY RELATED TO THE GENERAL LEVEL OF INTEREST RATES

(75) Inventor: John C. Doyle, Western Springs, IL (US)

(73) Assignee: Four Four Corporation, Chicago, IL (US)

( * ) Notice: Subject to any disclaimer, the term of this patent is extended or adjusted under 35 U.S.C. 154(b) by 0 days.

(21) Appl. No.: 09/273,673

(22) Filed: Mar. 22, 1999

(51) Int. Cl.
*G06Q 40/00* (2006.01)
(52) U.S. Cl. .......................... 705/37; 705/36
(58) Field of Classification Search ............ 705/1, 705/35–37, 34, 38, 4; 707/10, 100–104; 364/408
See application file for complete search history.

(56) References Cited

U.S. PATENT DOCUMENTS

| 4,903,201 | A | * | 2/1990 | Wagner ..................... 705/37 |
| 5,101,353 | A | * | 3/1992 | Lupien et al. |
| 5,126,936 | A | * | 6/1992 | Champion et al. |
| 5,970,479 | A | * | 10/1999 | Shepherd .................... 705/37 |
| 6,112,181 | A | | 8/2000 | Shear et al. |
| 6,157,918 | A | * | 12/2000 | Shepherd .................... 705/37 |
| 6,247,000 | B1 | * | 6/2001 | Hawkins et al. ............. 705/37 |
| 6,263,321 | B1 | * | 7/2001 | Daugherty ................... 705/36 |
| 6,304,858 | B1 | * | 10/2001 | Mosler et al. ............... 705/37 |
| 6,343,278 | B1 | * | 1/2002 | Jain ........................... 705/37 |
| 6,754,639 | B2 | * | 6/2004 | Ginsberg ................. 705/36 R |
| 2001/0056392 | A1 | * | 12/2001 | Daughtery, III ............. 705/36 |

OTHER PUBLICATIONS

Japan to Allow Banks to Enter Forward-Rate-Agreement Deals by Mari Pfeiffer. Asian Wall Street Journal, New York, N.Y.: Aug. 17, 1994. p. 15.*

* cited by examiner

*Primary Examiner*—Frantzy Poinvil
*Assistant Examiner*—Clement Graham
(74) *Attorney, Agent, or Firm*—McAndrews, Held & Malloy, Ltd.

(57) ABSTRACT

Certain embodiments include a method and apparatus for trading and clearing futures contracts using a clearing computer system. The apparatus includes providing a clearing computer system with an input device for receiving user input information including a base tick value and a trade price. The apparatus also includes a database for storing the user input information. The apparatus further includes a processor with programmable circuitry for calculating a settlement amount based on the user input information. Certain embodiments of the apparatus include a trigger for computer-assisted transfer of funds based on the settlement amount and an output for outputting at least one of the user input information and the settlement amount.

20 Claims, 2 Drawing Sheets

COMPUTER APPARATUS AND METHOD FOR TRADING AND CLEARING FUTURES CONTRACTS TO ACCOMMODATE A VARIABLE SENSITIVITY RELATED TO THE GENERAL LEVEL OF INTEREST RATES

I. TECHNICAL FIELD OF THE INVENTION

The present invention is in the field of digital electrical apparatus and methods for making and using the same, and products produced thereby. More particularly, the present invention is directed to a digital electrical apparatus and methods for data processing and data management having particular utility in the field of futures. Still more particularly, the present invention pertains to a method for making and using a digital electrical apparatus to process digital electrical signals to for trading and clearing futures contracts with a variable price sensitivity related to the general level of interest rates.

II. BACKGROUND OF THE INVENTION

For several years now, banks in the United States and in most developed nations have provided interest rate risk management products to their customers in the form of privately negotiated contracts commonly referred to as over the counter derivatives. These contracts have allowed both corporations and individuals to transfer unwanted risk exposure to changes in the general level of interest rates from themselves to their banks. By helping corporations and individuals manage their exposure to fluctuating interest rates, these derivatives have greatly improved the ability of global capital markets to distribute capital more efficiently and at reduced cost to both borrower and lender.

Banks are able to offer these products to their customers due to the fact that a variety of financial instruments have been developed which provide protection for the banks while they act as a conduit for the transfer of risk. Ultimately, the banks attempt to pass on the risk that they received from one customer, to another customer who can benefit from it. However, the financial instruments used to transfer the risk are limited in their ability to immunize banks from certain kinds of risks that they have accepted from their customers. As the world witnessed during the fall of 1998, interest rate markets can be very volatile and banks can still be very vulnerable to losses.

To fully understand the deficiencies in existing computer systems that provide support to futures exchanges where many of the financial instruments trade, a short explanation of the development and structure of those financial products is provided. In a typical interest rate derivative transaction, a bank will assume the interest rate exposure that a particular customer wishes to transfer, and the bank will collect a fee for this service. The ultimate goal of the bank is to intermediate between two customers with opposite needs. For example, the bank would like to find one customer who needs protection from rising interest rates and another customer who needs protection from declining interest rates. After the bank has assumed the exposure of one customer, but before it has had the opportunity to find the second customer with a need for the exposure, the bank will attempt to mitigate the risk associated with this exposure by utilizing one or more instruments that are available in the financial markets. These are referred to as hedge instruments.

Hedge instruments typically include: United States Treasury bonds and notes; futures contracts on these bonds and notes (traded at The Chicago Board of Trade), and Eurodollar futures contracts (traded at the Chicago Mercantile Exchange). While far from being a perfect hedge, these instruments have proven themselves capable of providing some interim protection from various interest rate risk exposures while the bank seeks to identify a customer who would benefit from said exposure. Once the second customer is identified, the bank will attempt to transfer the exposure to the second customer. If the second customer is agreeable, the bank will then transfer the risk and remove the temporary hedge that it had put on in the form of a purchase (or sale) of notes, bonds, or futures. The bank is then left with two interest rate derivative contracts, providing it with offsetting exposures to movements in interest rates. In effect, the bank has inter mediated between two of its customers, provided each with valuable risk management, and taken a fee for its efforts.

The following discussion is focused on the instruments available in the financial markets today for use by the banks for temporary or interim hedging. Each of the currently available instruments has certain advantages and disadvantages. The following evaluation of these instruments is based on two criteria: cost and utility.

Eurodollar futures provide a somewhat effective hedge due to the fact that their price responds to changes in LIBOR interest rates, and most interest rate derivatives are designed to transfer LIBOR risk from one entity to another. LIBOR is an acronym for London Interbank Offered Rate, a benchmark rate published in London every business day, and the most commonly used rate in commercial lending to price floating rate loans. Eurodollar futures provide a very cost effective hedge for a bank during the period that a bank seeks to permanently offset their exposure with either another customer or another bank. In addition to being sensitive to changes in LIBOR interest rates, Eurodollar futures have another very valuable design feature. They are designed to cover a period of only three months each, so that a bank can construct a hedge to match the term of its derivative contract. For example, if a bank enters into a derivative contract for a period of thirty months, the bank could buy (or sell) a string of ten Eurodollar futures, starting today and ending thirty months from today, with each contract covering a period of three months. This feature means that Eurodollars futures afford banks the most flexibility when hedging their interest rate risk.

The next kind of instruments includes United States Treasury (Treasury) bonds and notes. These two instruments are identical with the exception of time to maturity. Notes mature in ten years or less while bonds mature in ten years or more. For purposes of this discussion we will use the term "t-notes" to refer to both instruments. The primary advantage of t-notes for use as a hedge is that they do possess convexity very similar to the convexity exhibited by interest rate derivatives. Therefore, a bank utilizing t-notes to hedge its interest rate exposure would not be required to adjust the quantity of t-notes it had bought or sold as interest rates fluctuate from day to day. The primary drawback to t-notes for use as a hedge is that their price responds to changes in treasury interest rates rather than LIBOR interest rates. This is a major problem since the correlation between LIBOR interest rates and treasury interest rates is historically very low. In other words, LIBOR rates can change, affecting the value of the derivative, while treasury rates remain unchanged and therefore the value of the hedge remains unchanged. T-notes are commonly utilized to hedge interest rate derivatives which mature in three years or more, despite the fact that their use leaves a bank exposed to changes in the relationship between LIBOR interest rates and treasury interest rates. The other major problem with the use of t-notes to hedge interest rate derivatives is their lack of flexibility, Typically, there are just four t-notes available for use as a hedge. There are t-notes maturing in 2, 5, 10, and 30 years. There are, of course, many other t-notes available, but they are difficult to buy and sell efficiently. The four t-notes mentioned above are known as the "on the run" notes and the vast majority of the buying and selling in t-notes involves these four issues.

The third instrument, or group of instruments, is futures contracts on t-notes. These also are traded at the Chicago Board of Trade. The use of these contracts to hedge interest rate exposure is very limited due to the fact that these instruments possess the same disadvantages as t-notes but also possess an additional feature known as basis risk. The term "basis risk" refers to the fact that the value of these contracts is based on a formula which causes these contracts to have a very strong relationship with a specific t-note issued by the United States Treasury, and then to switch from time to time to a different specific t-note. This basis risk, along with the drawbacks that these instruments share with t-notes, causes them to be used very rarely by banks as a hedge for interest rate derivatives.

In addition to the hedge instruments in existence and in use for U.S. dollar denominated interest rate derivatives, their are two other hedge instruments available; one for Australian dollar denominated derivatives and one for Deutsche mark denominated derivatives. These are described because they are considered to be prior art.

The London International Financial Futures and Options Exchange (LIFFE) currently offers a product which it calls the Libor Financed Bond. This product was created by the LIFFE in an attempt to provide a hedge for Deutsche mark denominated, LIBOR based, interest rate derivatives. The Libor Financed Bond exhibits the convexity of an interest rate derivative, like t-notes, while at the same time providing price sensitivity to LIBOR interest rates. The Libor Financed Bond does not, however, provide the banks with the flexibility that Eurodollar futures do. The contract covers an interest period of either five years or ten years, compared to the three month period that the Eurodollar futures cover. The result is that the contract precludes banks from an optimal hedging of their interest rate exposure.

The other known prior art includes the Commonwealth Treasury Bond Future which is listed and traded at the Sydney Futures. Exchange (SFE) in Australia. This futures contract is designed to be sensitive to changes in the yield on ten year and three year Australian Government Bonds. The contract price is equal to 100 minus the yield on a hypothetical ten year and three year bond. The tick value of this contract varies with the yield of the bond, and the tick values are prescribed in a table published by the SFE. It is this variable tick value which confers upon the contract the convexity which the actual Australian Government Bonds possess. So these contracts posses convexity, which is the inventor herein believes to be desirable, but they are not sensitive to LIBOR interest rates and they do not provide the flexibility that shorter contracts like three month Eurodollar futures contracts do.

SUMMARY OF THE INVENTION

We have devised and designed an improved computer system for handling futures contracts trading and clearing. The improvement extends the capability of prior systems so as to accommodate and support a new financial product that we have named the FRA (Forward Rate Agreement) futures contract. A FRA can provide banks and investment banks with a financial instrument that they can utilize as a hedge for their LIBOR interest rate exposure. The IRA futures contract overcomes the deficiencies in existing instruments, as described above, and will make capital markets and the distribution of capital in the United States and all other developed nations more efficient. However, in order to trade and clear the FRA futures contract effectively requires a complex and sophisticated computer system. To fully appreciate the advances made in this computer system requires a brief explanation of the FRA futures contract itself. However, it is noted that the principles of the present invention are applicable to the trading and clearing of futures contracts other than the FRA futures contract. It is further noted that the FRA futures contract, and the computer system which supports the trading and clearing of the FRA futures contract, are applicable to any currency including, but not limited to, Japanese yen, British pound, French franc, Swiss Franc, Deutsche mark, European Currency Unit, Canadian dollar, Mexican peso, Russian ruble, etc. It is further noted that the FRA futures contract, and the computer system which is required to support the trading and clearing of the FRA futures contract, are applicable to any maturity of LIBOR. The most commonly referenced maturity is three months, but any maturity from one month to twelve months is applicable. It is further noted that the FRA futures contract, and the computer system which can be used to support the trading and clearing of the IRA futures contract, are applicable to any interest rate index. The most commonly referenced index for commercial lending is currently LIBOR, but Prime, Fed funds and commercial paper as used in the over the counter derivatives markets and described by the International Swap Dealers Association Handbook are applicable.

The FRA futures contract provides a completely new financial instrument for banks, and any other potential users, for use in hedging their LIBOR based interest rate exposure in a more cost effective, secure and robust way. The FRA futures contract will address all the major needs of a bank which seeks an instrument to hedge its LIBOR based interest rate exposure. The price of the IRA futures contract responds to changes in LIBOR interest rates, thus the user will not be exposed to the low correlation between LIBOR rates and United States Treasury interest rates, as they are currently when utilizing t-notes to hedge their interest rate exposure. The FRA futures contract covers an interest period of three months so that it provides flexibility in constructing a hedge for an interest rate derivative contract. The significant and innovative difference between the FRA futures contract and the Eurodollar futures contract is the Present Value Factor (PVF). By adding this feature to the contract specifications and applying this PVF to the tick value (dollar value of a minimum change in the price of the futures contract), we have added the critical attribute of convexity to this instrument.

In order to understand the role that the PVF plays, it is necessary to understand a little bit about the mechanics of the interest rate derivative market. When a bank enters into an over the counter interest rate derivative contract, the bank agrees to either pay, or be paid, an amount of money based on the prevailing market rate for three month LIBOR on some date in the future. That amount of money is called a floating rate payment. If the bank does not wish to accept the uncertainty regarding what the level of three month LIBOR may be on some date in the future, it will endeavor to hedge its exposure to the rise and fall of three month LIBOR. A popular vehicle for this is the Eurodollar futures contract. If a bank had agreed to pay three month LIBOR on September 16th of next year, it could sell an appropriate quantity of September Eurodollar futures as a hedge. This hedge would be effective since the price of Eurodollar futures goes down as the three month LIBOR rate goes up, and any losses incurred by three month LIBOR rising would be offset by the price of September Eurodollars declining. The income statement for the bank on September 16th of next year would show a loss on the over the counter interest rate derivative and an equal, but opposite, gain on the September Eurodollar futures contract. There is a problem, however. The over the counter interest rate derivative contract, which the bank agreed to, requires payment only at the end of the term of the contract, while the Eurodollar futures contract requires payment every day for any gains or losses incurred due the movement in the three month LIBOR rate. In other words, three month LIBOR could rise 10 percent and then fall 10 percent before the over the counter interest rate derivative contract expires and the bank would have no payment obligations under the terms of the over the counter interest rate derivative, while at the same time, the futures exchange would have paid the bank large sums of money when the LIBOR rate rose, and then would have demanded it back as the LIBOR rate went back to its original level. It is these mismatches in cash flows that cause the Eurodollar future to an ineffective hedge. Let us examine what would happen if three month LIBOR were to rise IO percent in June of next year. As three month LIBOR rose IO percent, the September Eurodollar future would decline by a like amount. The bank would be paid a sum of money by the futures exchange on the day that the rate moved. Since banks use the present value concept to report gains and losses in their derivative operations, the bank would report a gain on their Eurodollar futures position and a loss on their over the counter interest rate derivative position, but the loss on the derivative would be reported as the present value of the future cash flow, while the gain on the Eurodollar futures contract would be reported in its entirety. By definition, the loss on the derivative, present valued, would be less than the gain on the Eurodollar futures. It is this present value concept which causes the bank in our example to experience an imbalance between the derivative contract and the Eurodollar hedge. It is also this concept of present value that we are employing in our invention. The PVF will have the effect of making the gains or losses on the futures contracts equal to the gains and losses on the over the counter interest rate derivative contracts. Thus, instead of having a mismatch in the valuation of the interest rate derivative contract versus the Eurodollar futures contract, the bank would have the valuations of the interest rate derivative and the FRA futures contract exactly offsetting each other. So, to summarize, banks currently experience valuation mismatches between interest rate derivative contracts and Eurodollar futures contracts due to the discounting of future cash flows on the derivative versus the current cash flows on the Eurodollar futures contract. The FRA futures contract has all the same characteristics that a Eurodollar future was designed to include, but adds the critical feature of reducing the cash flows by a discount factor we call a PVF. The payment that would be made by the futures clearing entity in the above example would be multiplied by the PVF appropriate for the date of payment, and therefore reduced.

OBJECTS AND ADVANTAGES

In view of the foregoing, the inventors herein have made a first innovation in the field of futures that has created a need for a second innovation in the field of computer science, the latter being the subject of this patent application. Thus, an object of the invention for which a patent is sought is overcoming some or all of the drawbacks indicated herein by a computerized apparatus and method—all to aid in, and improve over, the efficiency, speed, accuracy, and versatility of prior art systems.

It is another object of the present invention to provide an apparatus (machine), method of making the machine, article of manufacture, necessary intermediate data structures, method of using the machine, and products produced by the method (collectively referenced herein as the method), wherein the method includes using a digital electrical computer in convex futures contract clearing It is another object of the present invention to provide for carrying out the method including by providing a clearing computer system including a digital electrical computer having a processor electrically connected to an input device for receiving input information and producing input electrical signals representing the input information, to an output device for producing a display corresponding to output electrical signals, and to a printer device for printing corresponding to the output electrical signals; and programming the processor to form circuitry in the processor to control the computer system in signal processing responsive to the input electrical signals to produce other electrical signals including the output electrical signals.

It is still another object of the present invention to provide for carrying out the method in data processing substeps of receiving, as a portion of the input information, a base tick value for a convex futures contract, an expiration time for the convex futures contract, identification of a buyer of the convex futures contract, identification of a seller of the convex futures contract, a trade price for the convex futures contract, and a settlement price for the convex futures contract; computing a discount factor from the settlement price; determining an actual tick value by applying the discount factor to the base tick value; specifying an amount of money a clearing entity must transfer between the buyer and the seller for clearing the convex futures contract by applying the actual tick value to a difference between the trade price data and the settlement price; triggering a computer-assisted transfer of the amount of money; and generating, at the printing device, documentation including the computed amount of money transferred, in clearing the trade of the convex futures contract.

It is still another object of the present invention to provide for carrying out the method by applying a bootstrap method to the computing of the settlement price.

It is yet another object of the present invention, in any of the objects set out above, to provide for carrying out the method by determining an actual tick value includes applying the discount factor to the base tick value to produce a variable actual tick value.

It is yet another object of the present invention, in any of the objects set out above, to provide for carrying out the method by generating a cumulative price quote for a group including another convex futures contract by and displaying the cumulative price quote on the display device to convey information for use in trading the group.

It is yet another object of the present invention, in any of the objects set out above, to provide for carrying out the method by generating a price for an floor option on the convex futures contract and by displaying the price for the floor option on the display device to convey information for use in trading the floor option.

It is yet another object of the present invention, in any of the objects set out above, to provide for carrying out the method by accounting for a limit, the limit from the group consisting of a cap, a floor, or both, in generating the price.

It is an additional object of the present invention, in any of the objects set out above, to provide for carrying out the method by facilitating communicating data representing the convex futures contract from the clearing computer system to a second digital electrical computer system and by using the data in computing a price for an Over-The-Counter option.

It is an additional object of the present invention, in any of the objects set out above, to provide for carrying out the method by forming an interest rate swap including the convex futures contract including computing interest payments for the interest rate swap with the second computer.

It is an additional object of the present invention, in any of the objects set out above, to provide for carrying out the method by communicating data representing the convex futures contract from the clearing computer system to an other digital electrical computer system and by computing, with the other digital electrical computer system, a zero coupon libor curve in real time and applying the zero coupon libor curve to a portfolio of interest rate derivatives to create forward rates, expected cash flows, and present value of the cash flows for risk management manipulation of the portfolio.

It is an additional object of the present invention, in any of the objects set out above, to provide for carrying out the method by calculating, with the other digital electrical computer system, an exposure indicia of movement in the curve.

It is an additional object of the present invention, in any of the objects set out above, to provide for carrying out the method by one or more in combination of the following: publishing daily quotes of the discount factor by clearing digital electrical computer system to provide information for use in trading the convex futures contract, publishing trading discount factor data in real time on a display board electrically connected to the clearing digital electrical computer system to provide information for use in trading the convex futures contract, conveying trading discount factor data in real time to a plurality of vendor computers electrically connected to the clearing digital electrical computer system to provide information for use in trading the convex futures contract, and conveying trading discount factor data in real time to a plurality of broker computers electrically connected to the clearing digital electrical computer system to provide information for use in trading the convex futures contract. It is an additional object of the present invention, in any of the objects set out above, to provide for carrying out the method by conveying trading discount factor data in real time to a plurality of customer computers electrically connected to the clearing digital electrical computer system to provide information for use in trading the convex futures contract—and in response to a trade triggered from one of the customer computers, generating confirmation statement at the clearing digital electrical computer to document the trade triggered from one of the customer computers.

It is an additional object of the present invention, in any of the objects set out above, to provide for carrying out the method by making convex futures contract documentation made by the foregoing method, especially wherein the method involves applying a bootstrap method to the settlement price.

It is yet still an additional object of the present invention, in any of the objects set out above, to provide for carrying out the method by publishing price data for the convex futures contract.

SUMMARY OF THE INVENTION

These and other objects of the present invention, as apparent from the specification as a whole, are carried out by providing an improved digital electrical computer apparatus and method for digital electrical machine-based computing capable of trading and clearing a sophisticated, next generation, futures contract such as the IRA futures contract. In particular, the computer system and method of the present invention provides machine-computational support for a futures contract with a tick value that varies with general level of interest rates. This futures contract would be available to banks and investment banks around the world for use in managing the risk associated with trading in over the counter interest rate derivative contracts.

The present invention involves a system performing several functions, which, when performed together, constitutes the trading, clearing and settlement of a financial futures contract. Generally, the system accepts data from the principles to all transactions consummated (e.g., on a particular day), keeps a running record of each principle's net position in each futures contract, performs a calculation which determines the price sensitivity of each futures contract to a given change in interest rates, and then calculates the appropriate transfer of funds between the principles involved in buying and selling the contract.

1. Determination of the Present Value Factor. At the end of a prescribed period of time, usually one day, a determination is made as to the closing price for each futures contract which is traded at a particular exchange or marketplace. This closing price is also known as the settlement price, and can be viewed as a fair representation of the price level which was prevalent in each futures contract at the prescribed time. This settlement price, or these settlement prices, is entered into an electronic input device which is connected to the clearing computer system. The first calculation to be performed by the clearing computer system utilizes the settlement price of the futures contract whose expiration date is closest to the current date. The calculation, which is detailed below, yields a result that we call the Present Value Factor (PVF). We refer to the first PVF as PVF1. The clearing computer system stores the value of PVF1 for use in subsequent calculations. The clearing computer repeats the process to determine PVF2 by utilizing the results of the first calculation and the settlement price of the futures contract whose expiration is next closest to the current date. The result of this second calculation is labeled PVF2 and also is stored. This process is repeated until there is a PVF for each futures contract listed by the exchange. ('Listed' is a term that means that a contract is available for trading and clearing). In other words, if there are futures contracts traded, e.g., with expiration dates in March, June, September and December in each of the next ten years, then this calculation is repeated forty times and the results would be PVF1 through PVF40. The process is analogous to building a pontoon bridge across a river; in order to build the next section of bridge, you must use all of the preceding sections to get to it.

2. Determination of the Actual Tick Value (ATV). After the clearing computer system has read the settlement prices for all the futures contracts and performed the calculation that yields the PVF for each of the futures contracts, the next step is for the clearing computer system to calculate the Actual Tick Value for each futures contract. The ATV is calculated by multiplying the Base Tick value, which is maintained in the clearing computer memory, by the PVF. Each futures contract (i.e., March 1999, June 1999, September 1999) is assigned an ATV. The ATV for the futures contract expiring closest to the current date will be labeled ATV1. The ATV will be an integral part of the next step, which will be the calculation of the settlement amounts do to/from the buyers and sellers of the futures contracts.

3. Determination of the settlement amount. Once the clearing computer system has assigned an ATV to each listed futures contract, the clearing computer system calculates the settlement amounts. A1 settlement amount is the amount of money which must be paid by those individuals or organizations who lost money on any given day, or, the amount of money which will be sent from the clearing entity to those individuals or organizations who made money on any given day. In order to determine this amount, several pieces of information must be either stored in or sent to the clearing computer system: (1) the number of contracts an individual or organization had net bought or sold by the end of the previous day, (2) the number of contracts an individual or organization bought or sold during the current day, (3) the price at which the individual or organization bought or sold during the current day, (4) the settlement price for each futures contract for the previous day, (5) the settlement price for each futures contract for the current day, (6) the Actual Tick Value (ATV) for the current day for each futures contract.

More specifically, and viewed from a different perspective, the system includes using a digital electrical computer in convex futures contract clearing, the method including the steps of: providing a clearing computer system including a digital electrical computer having a processor electrically connected to an input device for receiving input information and producing input electrical signals representing the input information, to an output device for producing a display corresponding to output electrical signals, and to a printer device for printing corresponding to the output electrical signals; and programming the processor to form circuitry in the processor to control the computer system in signal processing responsive to the input electrical signals to produce other electrical signals including the output electrical signals, in data processing substeps of: receiving, as a portion of the input information, a base tick value for a convex futures contract, an expiration time for the convex futures contract, identification of a buyer of the convex futures contract, identification of a seller of the convex futures contract, a trade price for the convex futures contract, and a settlement price for the convex futures contract; computing a discount factor from the settlement price; determining an actual tick value by applying the discount factor to the base tick value; specifying an amount of money a clearing entity must transfer between the buyer and the seller for clearing the convex futures contract by applying the actual tick value to a difference between the trade price data and the settlement price; triggering a computer-assisted transfer of the amount of money; and generating, at the printing device, documentation including the computed amount of money transferred, in clearing the trade of the convex futures contract.

In the foregoing system, the substep of computing a discount factor can include the substep of applying a bootstrap method to the settlement price.

In any of the foregoing, the substep of determining an actual tick value can include applying the discount factor to the base tick value to produce a variable actual tick value.

In any of the foregoing, it is possible to include the substeps of: generating a cumulative price quote for a group including another convex futures contract; and displaying the cumulative price quote on the display device to convey information for use in trading the group.

In any of the foregoing, it is also possible to include generating a price for an floor option on the convex futures contract; and displaying the price for the floor option on the display device to convey information for use in trading the floor option.

In the foregoing system, the step of generating a price can include accounting for a limit, the limit from the group consisting of a cap, a floor, or both, in generating the price.

In any of the foregoing, it is also possible to include communicating data representing the convex futures contract from the clearing computer system to a second digital electrical computer system; and using the data in computing a price for an Over-The-Counter option.

In any of the foregoing, the forming an interest rate swap including the convex futures contract can include computing interest payments for the interest rate swap with the second computer.

In any of the foregoing, it is further quite viable to include communicating data representing the convex futures contract from the clearing computer system to an other digital electrical computer system; and computing, with the other digital electrical computer system, a zero coupon libor curve in real time and applying the zero coupon libor curve to a portfolio of interest rate derivatives to create forward rates, expected cash flows, and present value of the cash flows for risk management manipulation of the portfolio.

In any of the foregoing, it is possible to further include calculating, with the other digital electrical computer system, an exposure indicia of movement in the curve.

In any of the foregoing, further possible to include one or any, combination of the following: publishing daily quotes of the discount factor by clearing digital electrical computer system to provide information for use in trading the convex futures contract, publishing trading discount factor data in real time on a display board electrically connected to the clearing digital electrical computer system to provide information for use in trading the convex futures contract, conveying trading discount factor data in real time to a plurality of vendor computers electrically connected to the clearing digital electrical computer system to provide information for use in trading the convex futures contract, and conveying trading discount factor data in real time to a plurality of broker computers electrically connected to the clearing digital electrical computer system to provide information for use in trading the convex futures contract.

In any of the foregoing, it is additionally possible to include conveying trading discount factor data in real time to a plurality of customer computers electrically connected to the clearing digital electrical computer system to provide information for use in trading the convex futures contract; and in response to a trade triggered from one of the customer computers, generating confirmation statement at the clearing digital electrical computer to document the trade triggered from one of the customer computers.

It should be clear that the system includes a convex futures contract documentation made by the process set out above, especially wherein the substep of computing a discount factor includes applying a bootstrap method to the settlement price. Of course in any of the above, it is best to carry out the publishing as including price data.

DETAILED DESCRIPTION OF A PREFERRED EMBODIMENT

Figure 1:
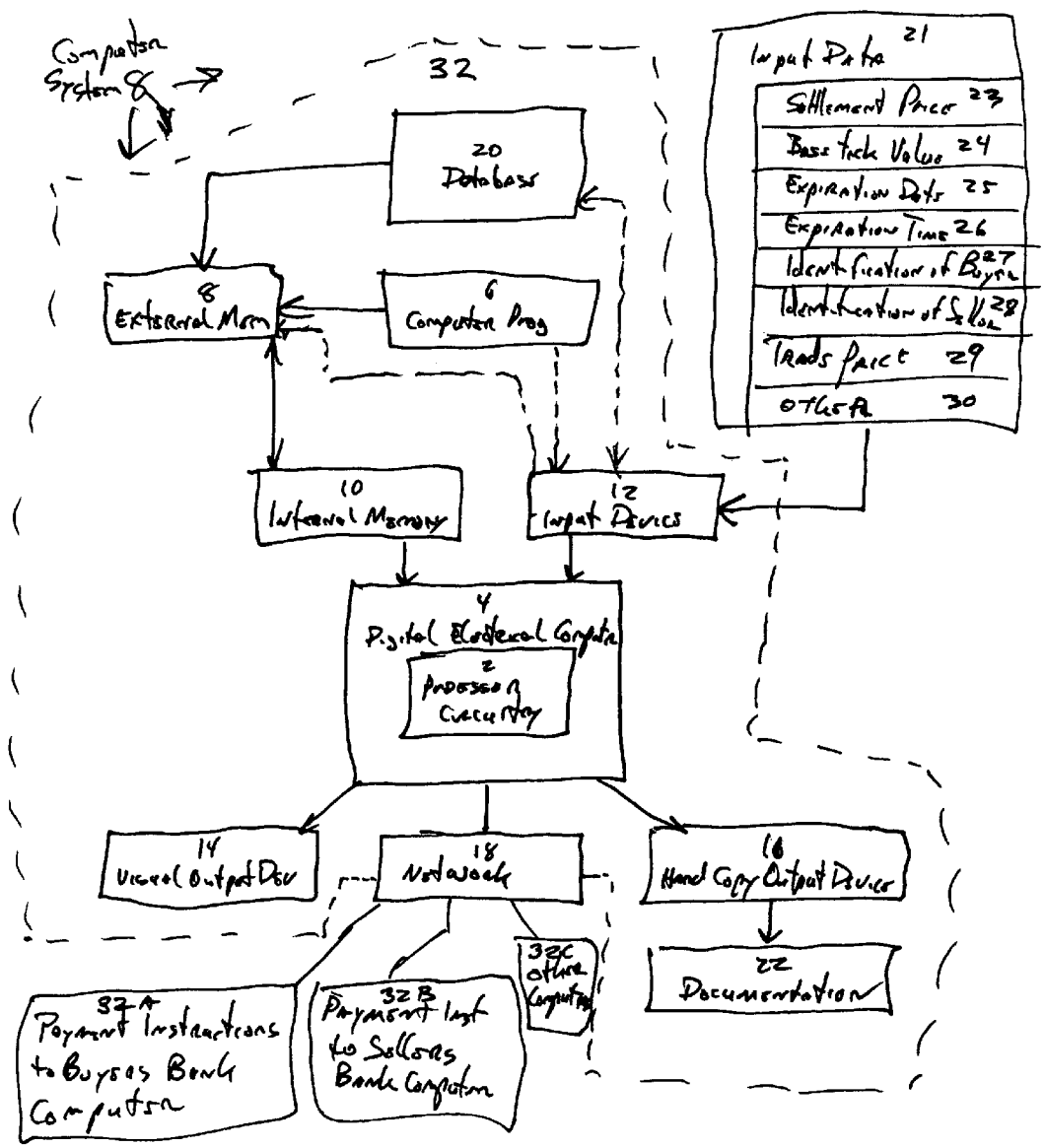
FIG. 1 is an overview of the structure of the present invention.

FIG. 1 shows, in block diagram form, the computer-based elements which can be utilized to implement the present invention. The present invention involves computer system 1, which includes processor circuitry 2 in a digital electrical computer 4. For flexibility, it is preferable to have the processor circuitry 2 formed by means of a computer program programming programmable circuitry, i.e., programming the computer (processor). The programming can be carried out with a computer program (or programs) 6, which for flexibility should be in the form of software stored in an external memory 8, such as a diskette, hard disk, virtual disk, or the like. (The virtual disk is actually an extended internal memory 10 that may assist in speeding up computing.) A diskette approach is optional, but it does provide a useful facility for inputting or storing data structures that are a product produced by the host software, as well as for inputting a software embodiment of the present invention. Of course storing the computer program 6 in a software medium is optional because the same result can be obtained by replacing the computer program in a software medium with a hardware storage device, e.g., by burning the computer program 6 into a ROM, using conventional techniques to convert software into an ASIC or FPGA, etc., as would be understood by one having a modicum of skill in the arts of computer science and electrical engineering. (It is well known in the art of computer science that it is a trivial technical exercise to go from specific hardware to software or vice versa. See, for example, James R. Goodman, Todd E. Marlette, and Peter K. Trzyna, "The Alappat Standard for Determining That Programmed Computers are Patentable Subject Matter," J.P.T.O.S. October 1994, Volume 76, No. 10, pages 771-786, and James R. Goodman, Todd E. Marlette, and Peter K. Trzyna, "Toward a Fact-based Standard for Determining Whether Programmed Computers are Patentable Subject Matter," J.P.T.O.S. May 1995, Vol. 77, No. 5, pages 353-367, both of which are incorporated by reference.) In this regard, it should also be noted that "input" can include inputting data for processing by the computer program 6 or inputting in the computer program 6 code itself.

An internal memory 10 works in cooperation with the external memory 8. An input device 12 could be a keyboard or equivalent means for a user to input the data discussed below. A visual display unit 14 can be employed for a visual representation, and a printer 16 can be employed for producing hard copy output 22. Note that output electrical data can also be stored to memory 8.

For such an embodiment, an IBM-compatible PC could work or such a computer system as is used at the Chicago Board of Trade, or the like. The input device 12, or a representative one of many, can be any ANSI standard terminal, and the visual display unit 14 can be a Trinatron color monitor. Still other alternatives include using a network of other computers or a mini-computer or a mainframe system. With such larger scale approaches, the external memory 8 could be a tape or a CD ROM for data retrieval. A VAX or Microvax system running VMS 5.0 or later is an acceptable approach.

As indicated above, an embodiment could also be carried out in hardware, though this is not recommended as it is an inflexible approach. Accordingly, a hardware implementation is described here for exemplary purposes. Of course it is well known that a computer program can be stored in hardware by many approaches, not the least of which is burning it into a ROM. More sophisticated than burning a ROM, but also entirely conventional, is to use techniques to translate the computer program 6 into an ASIC or a chip that will carry out the invention in an equivalent manner, and if fact with equivalent circuitry to that formed by programming programmable computer circuitry. It is all just digital electrical circuitry processing digital electrical signals, transforming them to output different electrical signals.

The present invention can best be implemented by utilizing a database 20 of files (or an equivalent, e.g., records, a relational database, etc.) pertaining to the present invention as discussed herein. In FIG. 1, respective dotted lines between database 20 and input device 12, and between computer program 6 and input device 12 illustrate that the computer program 6 and contents of database 20 can be obtained from data input at the input device 12, which converts the respective input data into respective electrical signals for handling by the digital electrical computer 4, and processor 2, including storing the respective digital electrical signals in the memories 8 and 10. Output electrical data, in the form of digital electrical signals, is generated by the processor 2 processing the input electrical data in a manner specified by the executable program 6, such that when operated, the system 1 as a whole produces a tangible presentation, such as that represented in FIG. 1 as documentation 22, including such documents as a Confirmation Statement, an equity run, reports, P&L cash flows, and other documents showing the identity or kind of the contracts, the number of contracts, and the price for the contracts.

There can be various kinds of input data 21 or information, including settlement price data 23, base tick value price data 24, expiration date data 25, expiration time data 26, identification of buyer data 27, identification of seller data 28, trade price data 29, and other data, which could include other computer programs, local files 24 (files specific to a particular user and not available to other users), data files corresponding to a user, utilities, reference files, etc.

More particularly, the input data 21 can include settlement price data 23 of the contract. This includes the price that is determined to be the representative price that last traded when the contract closed at the end of the period of time specified by the exchange (e.g., at the end of every hour, or at a specified time every day).

The input data 21 also can include the base tick value price data 24. This includes the dollar value for a minimum change in the price of the contract. For example, if the minimum price change is defined to be 0.01 and the tick value is $25.00, then a three tick move from 96.03 to 96.06 would result in a gain or loss of $75.00.

The input data 21 also can include the contract expiration date data 25 and the expiration time data 26. These can include the prescribed date and time when the contract stops trading and settlement must be made.

The input data 21 also can include the identification of buyer data 27, which includes the buyer—the name of the individual or organization which will benefit from an increase in the price of the contract.

The input data 21 also can include the Identification of the seller data 28, which includes the name of the individual or organization which will benefit from an decrease in the price of the contract.

The input data 21 also can include the trade price data 29: the price at which the buyer and seller agreed to contract the obligation.

Figure 2:
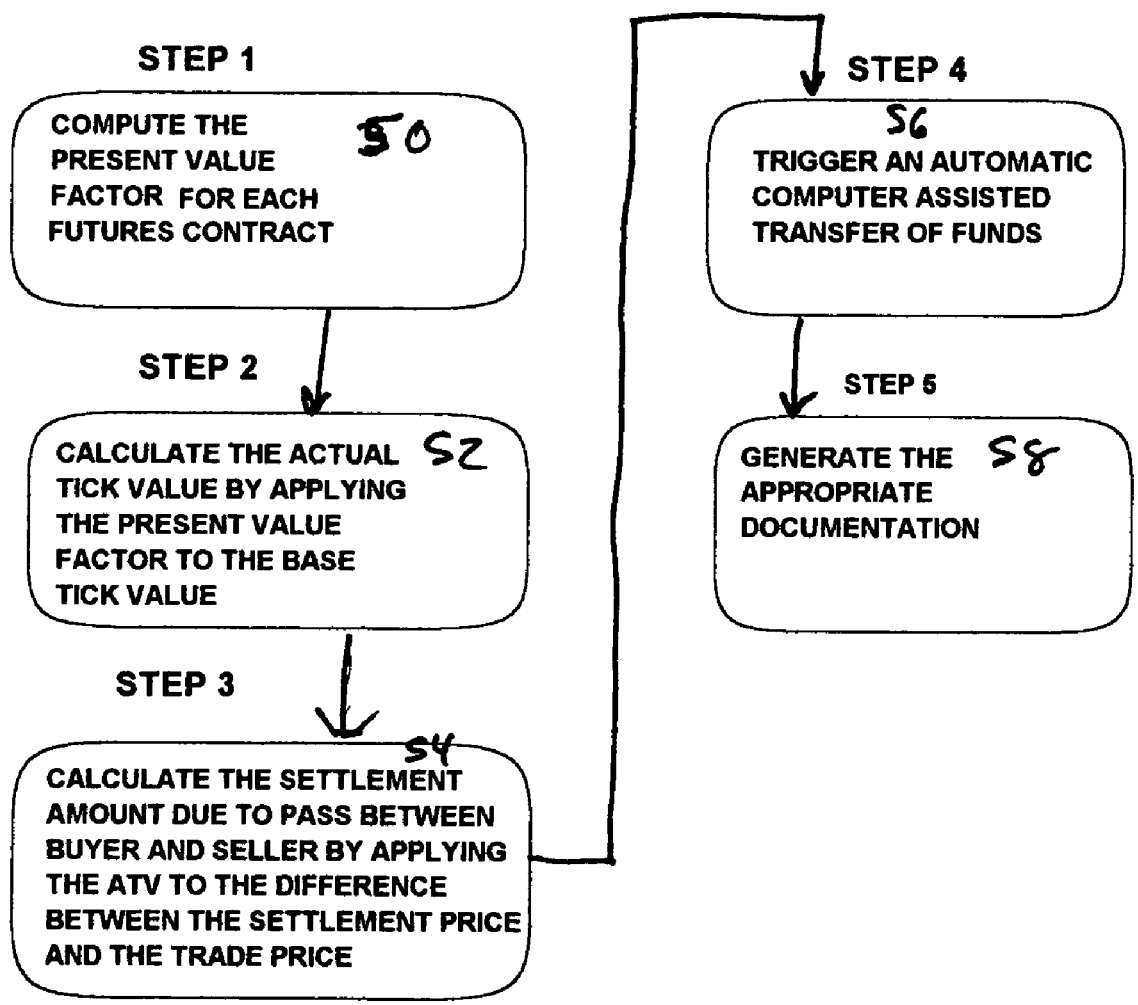
FIG. 2 is a flow chart for the present invention.

The above information is transmitted to the clearing computer via modem or other appropriate means. The information is then processed by the clearing computer as illustrated in FIG. 2, as follows.

Step 1

In block 50, the clearing computer 4 calculates the Present Value Factor (PVF). The mathematical formula is as follows: This is preferably a multi-step process that is done for each contract expiration.

Step 2

In block 52, after the PVF has been calculated, the clearing computer 4 determines the Actual Tick Value (ATV) by multiplying the Base Tick Value by the PVF. The result is the ATV. Again, this step must be completed for each contract expiration.

Step 3

In block 54, the clearing computer 4 calculates the settlement amount that is due to the buyer from the seller or to the seller from the buyer. The calculation is a matter of determining if the contract settlement price was above or below the trade price, and then determining how much money is due which party. The formula for the buyer's settlement amount is as follows:

$$B=(Ps-Pt)*ATV*100$$

where
  B=Settlement due to (from) buyer
  Ps=settlement price
  Pt=trade price
  ATV=actual tick value and the formula for the seller's settlement amount is as follows:

$$S=(Pt-P_s)*ATV*100$$

where
  S=Settlement due to (from) seller
  Ps=settlement price
  Pt=trade price
  ATV=actual tick value This step, like the others, is preferably repeated thousands of times in order for it to be useful.

Step 4

In block 56, the clearing computer 4 triggers a computer-assisted transfer of funds from the bank accounts of the buyers or sellers who lost money and to the bank accounts of the buyers and sellers who made money.

Step 5

In block 58, the clearing computer 4 generates and sends output to the printer and to terminals in the offices of trading firms who do business with the clearing corporation. This output includes a record of each trade, called a confirmation, the settlement price of each contract expiration and the settlement amount, or amount of money due to, or due from, each trading firm.

The programmed processor circuitry 2 uses the data 21, which represents some or all of the information or data input by the user to produce output data in a digital electrical form of a string of bits which correspond to processed data. The processor circuitry 2 carries out its operations by using at least one "filter", which can be characterized as an analysis or process restricted by a precise definition. Elements of the definition can be characterized by at least one logical operator or operand to indicate the precise definition or process to be carried out, e.g., whether the union or intersection of two elements or the complement of an element is required. The term "filter" is also applied to the process of applying this definition to change, create, or generate, or exclude data other than that defined from subsequent processing.

This invention can also be implemented by utilizing at least one pointer to insert a computed piece of data into the preformatted text of the above-referenced documentation in the appropriate data file(s). Alternatively, a plurality of pointers can be logically linked so that the output electrical data can be inserted in a plurality of locations in the aforementioned documentation 22. The computer program 6 controlling the digital electrical computer 4 checks for the pointer(s) to ascertain whether any electrical output data should be inserted in generating the documentation 22. This is preferable to an approach of doing the computing described in FIG. 2 and then manually entering the computed amounts on printed documentation preformatted to accommodate the inserted amounts.

In FIG. 1, dotted box 32 represents a detailed view of a first computer system. For the sake of brevity, it should be understood that related computer systems 32A, 32B, 32C have much the same structure, except of 10a course that the respective computers have respectively programmed processors with corresponding circuitry unique to their functions. Thus, it should be understood that 32A, 32B, and 32C have respective monitors, input devices, output devices, links to network 18 (e.g., the Internet, an intranet, dedicated lines, etc.).

Accordingly, as set out above and shown in the figures, the present invention includes a method for using a digital electrical computer in convex futures contract clearing, as well as a method for making digital circuitry, data structures as necessary intermediates, and the apparatus itself. With this understanding, for the sake of brevity, the following discussion is made with reference to the method of use. The method includes the steps of: providing a clearing computer system including a digital electrical computer having a processor electrically connected to an input device for receiving input information and producing input electrical signals representing the input information, to an output device for producing a display corresponding to output electrical signals, and to a printer device for printing corresponding to the output electrical signals; and programming the processor to form circuitry in the processor to control the computer system in signal processing responsive to the input electrical signals to produce other electrical signals including the output electrical signals, in data processing substeps of: receiving, as a portion of the input information, a base tick value for a convex futures contract, an expiration time for the convex futures contract, identification of a buyer of the convex futures contract, identification of a seller of the convex futures contract, a trade price for the convex futures contract, and a settlement price for the convex futures contract; computing a discount factor from the settlement price; determining an actual tick value by applying the discount factor to the base tick value; specifying an amount of money a clearing entity must transfer between the buyer and the seller for clearing the convex futures contract by applying the actual tick value to a difference between the trade price data and the settlement price; triggering a computer-assisted transfer of the amount of money; and generating, at the printing device, documentation including the computed amount of money transferred, in clearing the trade of the convex futures contract.

The foregoing method can be carried out such that the substep of computing a discount factor includes the substep of applying a bootstrap method to the settlement price. Alternatively, or in combination, the foregoing method can be carried out such that the substep of determining an actual tick value includes applying the discount factor to the base tick value to produce a variable actual tick value. Likewise alternatively, or in combination, the foregoing method can be carried out further including the substeps of: generating a cumulative price quote for a group including another convex futures contract; and displaying the cumulative price quote on the display device to convey information for use in trading the group.

Moreover, in any of the foregoing, alternatively, or in combination, the method can be carried out as including generating a price for an floor option on the convex futures contract; and displaying the price for the floor option on the display device to convey information for use in trading the floor option. In such a case, the step of generating a price can include accounting for a limit, the limit from the group consisting of a cap, a floor, or both, in generating the price.

And in any of the foregoing, alternatively, or in combination, the method can be carried out further including: communicating data representing the convex futures contract from the clearing computer system to a second digital electrical computer system; and using the data in computing a price for an Over-The-Counter option. In such case, the forming an interest rate swap including the convex futures contract can include computing interest payments for the interest rate swap with the second computer.

Additionally, in any of the foregoing, alternatively, or in combination, the method can be carried out further including: communicating data representing the convex futures contract from the clearing computer system to an other digital electrical computer system; and computing, with the other digital electrical computer system, a zero coupon libor curve in real time and applying the zero coupon libor curve to a portfolio of interest rate derivatives to create forward rates, expected cash flows, and present value of the cash flows for risk management manipulation of the portfolio. In such a case, the method can further include: calculating, with the other digital electrical computer system, an exposure indicia of movement in the curve.

Yet additionally in any of the foregoing, alternatively, or in combination, the method can be carried out further including: publishing daily quotes of the discount factor by clearing digital electrical computer system to provide information for use in trading the convex futures contract; publishing trading discount factor data in real time on a display board electrically connected to the clearing digital electrical computer system to provide information for use in trading the convex futures contract; conveying trading discount factor data in real time to a plurality of vendor computers electrically connected to the clearing digital electrical computer system to provide information for use in trading the convex futures contract; conveying trading discount factor data in real time to a plurality of broker computers electrically connected to the clearing digital electrical computer system to provide information for use in trading the convex futures contract; and/or conveying trading discount factor data in real time to a plurality of customer computers electrically connected to the clearing digital electrical computer system to provide information for use in trading the convex futures contract—and in response to a trade triggered from one of the customer computers—generating confirmation statement at the clearing digital electrical computer to document the trade triggered from one of the customer computers.

Preferably, the present invention is viewed as extending to convex futures contract documentation made by the process including: providing a clearing computer system including a digital electrical computer having a processor electrically connected to an input device for receiving input information and producing input electrical signals representing the input information, to an output device for producing a display corresponding to output electrical signals, and to a printer device for printing corresponding to the output electrical signals; and programming the processor to form circuitry in the processor to control the computer system in signal processing responsive to the input electrical signals to produce other electrical signals including the output electrical signals, in data processing substeps of: receiving, as a portion of the input information, a base tick value for a convex futures contract, an expiration time for the convex futures contract, identification of a buyer of the convex futures contract, identification of a seller of the convex futures contract, a trade price for the convex futures contract, and a settlement price for the convex futures contract; computing a discount factor from the settlement price; determining an actual tick value by applying the discount factor to the base tick value; specifying an amount of money a clearing entity must transfer between the buyer and the seller for clearing the convex futures contract by applying the actual tick value to a difference between the trade price data and the settlement price; triggering a computer-assisted transfer of the amount of money; and generating, at the printing device, documentation including the computed amount of money transferred, in clearing the trade of the convex futures contract. In such case, the documentation can be made by the process wherein the substep of computing a discount factor includes applying a bootstrap method to the settlement price. However, in any case, preferably, the invention extends to publishing price data.

While the above description contains many specificities, these should not be construed as limitations on the scope of the invention, but rather as an exemplification of one preferred embodiment thereof. Many other variations are possible such as, but not limited to, those described in the Objects and Advantages section above. Thus, the scope of the invention should be determined by the appended claims and their legal equivalents, rather than by the principal embodiment and other examples described above.

I claim:

1. A system for forward rate agreement futures contract trading, wherein a forward rate agreement futures contract comprises a convex futures contract related to a London Interbank Offered Rate (LIBOR), said system comprising:
   an input device receiving or having access to:
   1) a settlement price for each of a plurality of forward rate agreement futures contracts listed by an exchange,
   2) expirations for each of the plurality of forward rate agreement futures contracts,
   3) an identification of a seller of each of the plurality of forward rate agreement futures contracts,
   4) an identification of a buyer of each of the plurality of forward rate agreement futures contracts,
   5) a trade price for each of the plurality of forward rate agreement futures contracts, and
   6) a base tick value representing a currency value for a minimum change in a contract price; and
   a processor configured to:
   1) calculate and save a present value factor using the settlement price of a forward rate agreement futures contract of the plurality of forward rate agreement futures contracts whose expiration is closest to the current date on which the present value factor is calculated, the processor calculating and saving a present value factor for each of the remaining plurality of forward rate agreement futures contracts based on the previous present value factor calculation and the settlement price of the forward rate agreement futures contract whose expiration is next closest to the current date on which the present value factor is calculated, 2) determine an actual tick value for each of the plurality of forward rate agreement futures contracts based on the present value factor for the forward rate agreement futures contract and the base tick value, 3) generate a settlement amount for each of the plurality of forward rate agreement futures contracts using:
   a) a number of contracts net bought or sold by an entity by the end of the previous day,
   b) a number of contracts bought or sold by the entity by the end of the current day,
   c) a price at which the entity bought or sold during the current day,
   d) a settlement price for each contract for the previous day,
   e) a settlement price for each contract for the current day, and
   f) the actual tick value for the current day for each forward rate agreement futures contract,
the settlement amount representing, for each forward rate agreement futures contract, an amount paid by an entity that lost money to the exchange or paid by the exchange to an entity that made money on the current day, and 4) generate payment instructions for at least one of a buyer's bank and a seller's bank based on the settlement amount for each of the plurality of forward rate agreement futures contracts.

2. The system of claim 1, further comprising an output device generating documentation of a funds transfer and confirmation of trade.

3. The system of claim 1, wherein the present value factor (PVF) is determined $$\text{using } PVF = \frac{1}{[1 + R_0(D_0/360)] \times [1 + F_1(D_1/360)] \times \ldots \times [1 + F_n(D_n/360)]},$$

wherein $R_0$ represents a spot LIBOR for a first futures contract expiration, $D_0$ represents a number of days from spot to the first futures contract expiration, $D_n$ represents a number of days from spot to a last listed futures contract, $F_1$ represents a forward rate implied by the first futures contract, and $F_n$ represents a forward rate implied by the last listed futures contract.

4. The system of claim 1, wherein the actual tick value is determined by multiplying the base tick value by the present value factor.

5. The system of claim 1, wherein the settlement amount for a futures contract buyer is determined using $B=(P_s-P_t)\times ATV\times 100$, wherein B represents a settlement amount due to or from a buyer for a futures contract, $P_s$ represents the settlement price for the futures contract, $P_t$ represents the trade price for the futures contract, and ATV represents the actual tick value for the futures contract, and wherein the settlement amount for a futures contract seller is determined using $S=(P_t-P_s)\times ATV\times 100$, wherein S represents a settlement amount due to or from a seller for a futures contract, $P_s$ represents the settlement price for the futures contract, $P_t$ represents the trade price for the futures contract, and ATV represents the actual tick value for the futures contract.

6. A computer implemented method for convex futures contract trading, the convex futures contract price related to an interest rate, wherein a plurality of convex futures contracts are listed on an exchange and each of the plurality of convex futures contracts has a related settlement price, expiration, and trade price, said method comprising:

calculating and saving a first present value factor using the settlement price of a first convex futures contract of the plurality of convex futures contracts whose expiration is closest to the current date on which the first present value factor is calculated;

calculating and saving a present value factor for each of the remaining plurality of convex futures contracts based on the previous present value factor calculation and the settlement price of the convex futures contract whose expiration is next closest to the current date on which the present value factor is calculated;

determining an actual tick value for each of the plurality of convex futures contracts based on the present value factor for the convex futures contract and a base tick value representing a currency value for a minimum change in a contract price;

generating a settlement amount for each of the plurality of convex futures contracts using:
1) a number of contracts net bought or sold by an entity by the end of the previous day,
2) a number of contracts bought or sold by the entity by the end of the current day,
3) a price at which the entity bought or sold during the current day,
4) a settlement price for each contract for the previous day,
5) a settlement price for each contract for the current day, and
6) the actual tick value for the current day for each convex futures contract, the settlement amount representing, for each convex futures contract, an amount paid by an entity that lost money to the exchange or paid by the exchange to an entity that made money on the current day; and generating payment instructions for at least one of a buyer's bank and a seller's bank based on the settlement amount for each of the plurality of convex futures contracts.

7. The method of claim 6, further comprising generating documentation of a funds transfer and confirmation of trade.

8. The method of claim 6, wherein the present value factor (PVF) is determined $$\text{using } PVF = \frac{1}{[1 + R_0(D_0/360)] \times [1 + F_1(D_1/360)] \times \ldots \times [1 + F_n(D_n/360)]},$$

wherein $R_0$ represents a spot LIBOR for a first futures contract expiration, $D_0$ represents a number of days from spot to the first futures contract expiration, $D_n$ represents a number of days from spot to a last listed futures contract, $F_1$ represents a forward rate implied by the first futures contract, and $F_n$ represents a forward rate implied by the last listed futures contract.

9. The method of claim 6, wherein the actual tick value is determined by multiplying the base tick value by the present value factor.

10. The method of claim 6, wherein the settlement amount for a futures contract buyer is determined using $B=(P_s-P_t)\times ATV\times 100$, wherein B represents a settlement amount due to or from a buyer for a futures contract, $P_s$ represents the settlement price for the futures contract, $P_t$ represents the trade price for the futures contract, and ATV represents the actual tick value for the futures contract, and wherein the settlement amount for a futures contract seller is determined using $S=(P_t-P_s)\times ATV\times 100$, wherein S represents a settlement amount due to or from a seller for a futures contract, $P_s$ represents the settlement price for the futures contract, $P_t$ represents the trade price for the futures contract, and ATV represents the actual tick value for the futures contract.

11. The method of claim 6, further comprising:
generating a cumulative price quote for a group including a plurality of convex futures contract; and
displaying the cumulative price quote on the display device to convey information for use in trading the group.

12. The method of claim 6, further comprising:
generating a price for a floor option on a convex futures contract; and
displaying the price for the floor option on the display device to convey information for use in trading the floor option.

13. The method of claim 12, wherein the step of generating a price includes accounting for a limit, the limit from the group consisting of a cap, a floor, or both, in generating the price.

14. The method of claim 6, further comprising using data representing a convex futures contract in computing a price for an Over-The-Counter option.

15. The method of claim 14, wherein the forming an interest rate swap including the convex futures contract includes computing interest payments for the interest rate swap.

16. The method of claim 6, further comprising computing a zero coupon libor curve in real time and applying the zero coupon libor curve to a portfolio of interest rate derivatives to create forward rates, expected cash flows, and present value of the case flows for risk management manipulation of the portfolio.

17. The method of claim 16, further comprising calculating an exposure indicia of movement in the curve.

18. The method of claim 6, further comprising publishing daily quotes of the present value factors for each of the plurality of convex futures contracts to provide information for use in trading the convex futures contracts.

19. The method of claim 6, further comprising conveying present value factor data to a plurality of vendor or broker computers on the exchange for use in trading one or more of the plurality of convex futures contracts.

20. A computer implemented method for clearing convex futures contracts traded on an exchange by one or more trading firms, a price of the convex futures contracts related to an interest rate, said method comprising:
multiplying a trade price for a convex futures contract by a discount factor for an appropriate date to determine a settlement amount due by or to a trading firm, the discount factor modifying the trade price based on a base tick value adjusted by a representative closing price of last trading for the convex futures contract for the appropriate date;
notifying the trading firm of a trade confirmation for the convex futures contract, the trade price for the convex futures contract, the discount factor for the convex futures contract, open positions for the convex futures contract, and the settlement amount due to or from the trading firm; and
triggering a computer-assisted transfer of funds to or from an account associated with the trading firm.

\* \* \* \* \*